United States Patent [19]

Martinelli

[11] Patent Number: 4,652,129
[45] Date of Patent: * Mar. 24, 1987

[54] INTERFEROMETRIC DETECTOR WITH FIBRE-OPTIC SENSOR

[75] Inventor: Mario Martinelli, Milan, Italy

[73] Assignee: CISE - Centro Informazioni Studi Esperienze S.p.A., Milan, Italy

[*] Notice: The portion of the term of this patent subsequent to Dec. 13, 2000 has been disclaimed.

[21] Appl. No.: 519,311

[22] Filed: Aug. 1, 1983

[51] Int. Cl.$^4$ .................................................. G01B 9/02
[52] U.S. Cl. .................................... 356/345; 250/227; 356/351
[58] Field of Search ............... 356/345, 346, 349, 351; 250/227

[56] References Cited

U.S. PATENT DOCUMENTS 4,420,260 12/1983 Martinelli ............................ 356/351

FOREIGN PATENT DOCUMENTS 3031961 3/1982 Fed. Rep. of Germany ...... 356/346
3044183 6/1982 Fed. Rep. of Germany .
932219 5/1982 U.S.S.R. .............................. 356/351

Primary Examiner—Vincent P. McGraw
Assistant Examiner—Matthew W. Koren
Attorney, Agent, or Firm—Cushman, Darby & Cushman

[57] ABSTRACT

The detector comprises an electro-optical section for the signal analysis, a transmission fibre-optic, a fibre-optic coupling of high immunity to environmental noise, and a fibre-optic sensor terminating in a reflecting element. It can be provided in either homodyne or heterodyne version (phase or frequency modulation). This latter version has the advantage of detecting phase modulations exceeding $2\pi$ radians. Both the versions have the advantage of enabling measurements to be made which are not influenced by environmental disturbances affecting the transmission fibre-optic.

3 Claims, 2 Drawing Figures

INTERFEROMETRIC DETECTOR WITH FIBRE-OPTIC SENSOR

This invention relates to an interferometric detector with a fibre-optic sensor.

The use of fibre-optic sensors for detecting physical phenomena, such as vibrations and slow deformations, has certain problems, which can be summarised as follows:

In the case of fibre-optic sensors for detecting vibrations, it has been shown that the high sensitivity of the sensor is limited by the undesirable noise induced by the vibrations over the fibre portion leading to the actual sensor. The measurement, and even the quantitative measurement, of the vibration characteristics requires the almost total suppression of this noise. Moreover, for typical structure sizes, the phase displacement induced in the sensor means that operation under frequency modulation conditions is necessary.

In the case of fibre-optic sensors for detecting slow deformations (strain gauges) the useful phase signal is masked by a signal of thermal and mechanical origin having a frequency which is analogous to that of the useful signal. It is again necessary in this case to suppress the disturbance signal. A suitable phase modulation system for the reference signal enables a measurement of the useful phase displacement to be supplied.

The object of the present invention is to provide a detector with a fibre-optic sensor, which can be used effectively and without drawbacks for a variety of uses and different physical phenomena, in particular for detecting vibrations and slow deformations.

This object is attained according to the invention by an interferometric detector, characterised by comprising three main sections connected together, a first section including a fibre-optic sensor terminating in a reflecting element arranged to reflect a measurement signal when reached by a scanning signal transmitted to said sensor, a second section including a fibre-optic interferometric coupling for combining said measurement signal and a reference signal to form a combined return signal and further including a fibre-optic for transmitting said scanning signal and said combined return signal in opposite directions, and a third section including an optical scanning signal generator and an electro-optical analysis system for said return signal.

The main advantage of the detector according to the invention, which overall can be likened to a particular type of fibre-optic interferometer in a version modified with respect to the known Michelson interferometer, is that by combining the reflected measurement signal with the reference signal, the undesirable noise induced into the fibre-optic portion between the sensor and the generating and analysis section can be suppressed. It is thus possible to make measurements uninfluenced by environmental disturbances which affect the transmission fibre-optic.

Furthermore, by suitable frequency or phase modulation of the reference signal, it is possible to demodulate and thus detect phase signals exceeding $2\pi$ radians originating from the fibre-optic sensor.

Finally, because of the division into three separate sections, there is the advantage of modular construction which allows easy change of the individual sections for adapting the detector to different uses.

The characteristics of the present invention will be more apparent from the detailed description given hereinafter of two possible embodiments thereof, illustrated by way of example on the accompanying drawings, in which.

Figure 1:
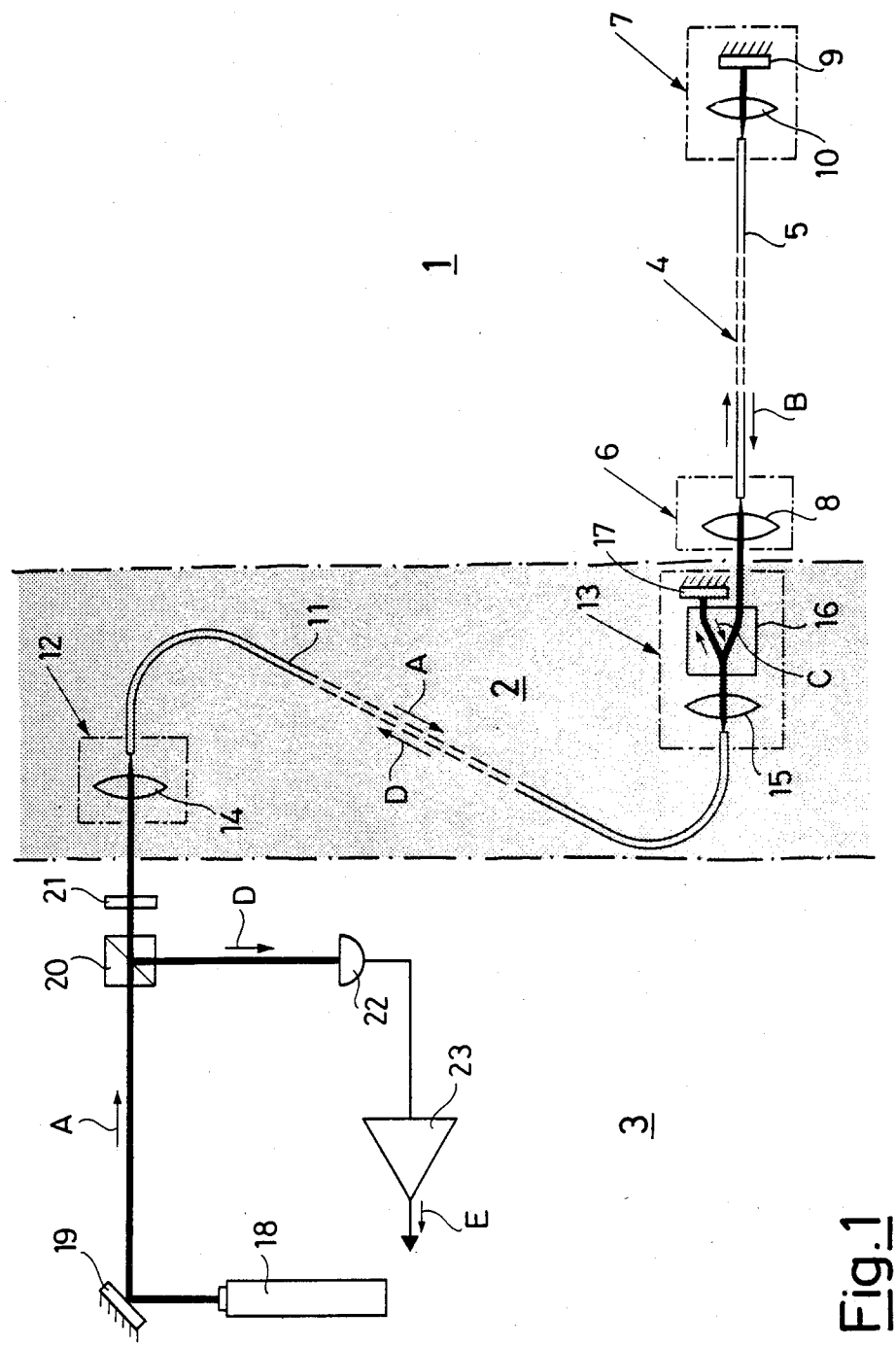
FIG. 1 shows a detector according to the invention in homodyne version, ie without modulation of the reference signal.

The detector shown in FIG. 1 is constituted by three main sections 1, 2 and 3, which are connected together and can either be combined into a single assembly, or can extend separately.

Section 1 (or sensing section) comprises a fibre-optic sensor 4 constituted by a monomode fibre-optic 5 (although the potential possibility of using a multimode fibre-optic is not excluded), which represents the element for sensing the physical quantities of interest (pressure, deformation, temperature etc.), and two termination connectors 6 and 7. The connector 6 is a simple connector for monomode fibre-optic, provided (but not necessarily) with a focusing system 8 which allows more easy coupling. The connector 7 is constituted by a reflecting element 9 which feeds into the fibre-optic 5 the optical scanning signal fed to the sensor 4 when in use. Said reflecting element can be formed directly on the fibre-optic 5 (integral version) or can be formed separately and provided with a focusing system 10, as shown in FIG. 1.

Section 2 (or fibre-optic transmission section) comprises a monomode fibre-optic 11 terminating in two connectors 12 and 13. The connector 12, equal to the connector 6 of the sensor 4, is a common connector for monomode fibre-optic provided (but not necessarily) with a focusing system 14. The connector 13 consists of a fibre-optic interferometric coupling composed of a focusing system 15, a beam splitter 16 and a reflecting element 17. The splitter 16 and reflecting element 17 can constitute a single component. The splitter 16 can be in various forms, such as a discrete optical element, integrated optical element or fibre-optic splitter. The presence of the focusing system 15 may be found unnecessary.

Finally, section 3 (or generating and analysis section) comprises an optical scanning signal generator constituted by a laser source 18, a mirror 19 for deviating the laser beam, a polarising beam separator 20, a $\lambda/4$ delay plate indicated by 21, a photodetector 22, and finally a signal amplifier 23. The laser source 18 is chosen with coherence characteristics suitable for interferometric detection and linear polarisation (for example horizontal).

The detector of FIG. 1 is intended to operate as follows. The laser source 18 generates an optical scanning signal A constituted by a laser beam of horizontal polarisation, which passes through the polarising beam separator 20 and the delay plate 21, beyond which it is of circular polarisation, to reach the fibre-optic transmission section 2, where it is focused by the focusing system 14 of the connector 12. On passing through the fibre-optic 11 and reaching the beam splitter 16, part of the scanning signal or beam A proceeds towards the fibre-optic sensor 4 as far as the reflecting element 9, which gives rise to the reflected measurement signal or beam B, while a further part of the same scanning signal is deviated towards the reflecting element 17, and from here it is reflected to give rise to a reference signal or beam C, which has undergone the same environmental disturbances as the measurement signal B during its passage through the fibre-optic 11. The two signals B and C are combined with each other interferentially in the beam splitter 16, to give rise to a combined return signal or beam D, which passes through the fibre-optic 11 to return to the generating and analysis section 3. Here, said reflected beam passes through the plates 21 emerging with vertical polarisation, and is then deviated by the beam separator 20 towards the photodetector 22, which converts it into an electrical signal which is subsequently amplified by the amplifier 23. In this manner an electrical measurement signal E is obtained which by virtue of the combination of the measurement and reference signals B and C in the interferometric coupling 13 is immune from environmental noise however originated.

Figure 2:
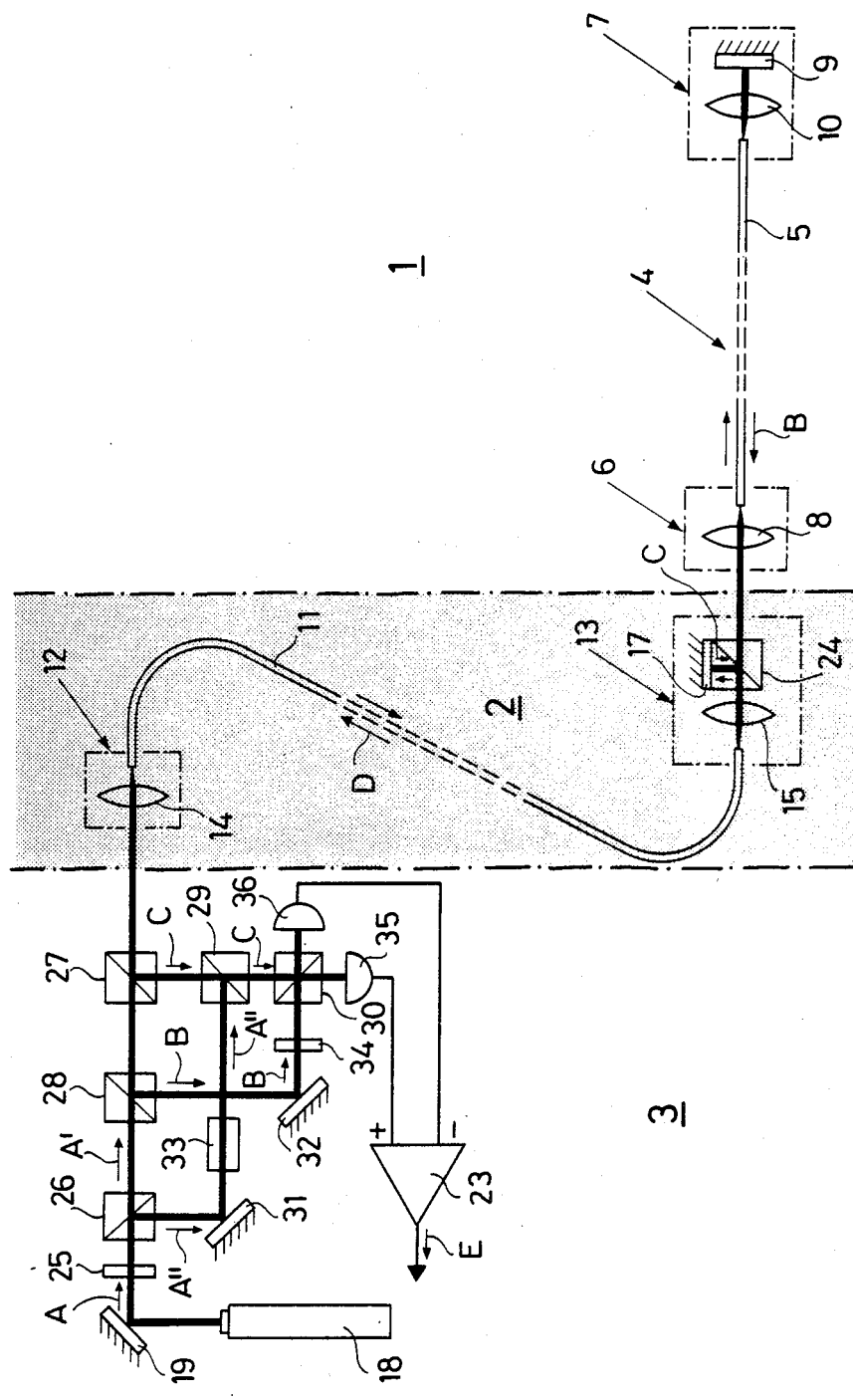
FIG. 2 shows a detector according to the invention in heterodyne version, ie with frequency (or phase) modulation of the reference signal.

The detector of FIG. 1 is of homodyne version, ie with its measurement signal and reference signal of equal frequency, whereas the detector of FIG. 2 is of heterodyne version, ie with frequency (or phase) modulation of the reference signal.

It is also divided into three sections 1, 2 and 3, such as that of FIG. 1, and is identically constructed with regard to the sensing section 1. However, the transmission section 2 is different, in which a beam polarising splitter 24 performs functions inside the interferometric coupling 13 which are analogous to those performed by the beam splitter 16 of the detector of FIG. 1. The generating and analysis section 3 is even more different, in which the polarising beam separator 20, the delay plate 21 and the photodetector 22 are replaced by a unit comprising a polarising plate 25, two polarising beam separators 26 and 27, three beam separators 28, 29 and 30, two mirrors 31 and 32, a modulator 33, a λ/4 delay plate indicated by 34, and two photodetectors 35 and 36, and in which the amplifier 23 is now of differential type. The different method of operation of the modified parts is as follows. The laser beam A is polarised circularly or elliptically by the plate 25 and is then fed to the polarising beam separator 26, which divides it into two parts A' and A'', of horizontal and vertical polarisation respectively.

The beam A' of horizontal polarisation passes undisturbed through the beam separators 28 and 27 to reach the fibre-optic 11 and then the sensor 5, where, reflected by the reflecting element 9, it forms the reflected measurement beam or signal B.

The beam A'' of vertical polarisation is deviated towards the mirror 31, and from here is fed to the modulator 33 which allows controlled modulation of the optical beam. The modulated beam is then re-conducted by the beam separators 29 and 27 to the transmission fibre-optic 11, through which it reaches the polarising beam separator 24, which deviates it towards the reflecting element 17 to produce by retroreflection the reference beam or signal C. This latter is frequency or phase modulated according to the type of modulator 33 used. Specifically, to obtain frequency modulation the modulator 33 must comprise an electro-optical crystal fed with a sinusoidal or sawtooth voltage. In contrast, to obtain slow phase modulation, the modulator must be of the "rotary plate" type controlled by a feedback signal from the photodetectors. In all cases, the modulator 33 is chosen according to the detection requirements.

The beam separator 27 then again separates the two return beams B and C, which subsequently recombine in the beam separator 30 after the first has passed through the beam separator 28 and the delay plate 34 (which makes the polarisation of the measurement beam vertical), and the second has passed through the beam separator 29. The interference fringes produced by recombining the beams are then detected by the photodetectors 35 and 36 disposed in differential configuration at the inputs of the amplifier 23. This configuration increases detection sensitivity, and suppresses common mode signals which affect the photodetectors.

The result is a detected signal E which by virtue of the combination of the signals B and C in the interferometric coupling 13 is immune from environmental noise, and which because of the frequency (or phase) modulation of the reference signal is able to detect signals of phase exceeding $2\pi$ radians originating from the fibre-optic sensor.

It should be noted that in addition to the configurations illustrated on the drawings and described in detail herein, the electro-optical section for analysing the return signal, especially in the heterodyne version, can assume slightly different optical configurations in order to satisfy decoupling requirements between the laser source and the return signal, and to satisfy electronic detection requirements. In all cases, such configurations maintain the general principle of operation illustrated herein unaltered.

I claim:

1. An interferometric detector with a fibre-optic sensor, characterized by comprising three main sections connected together, a first section including a fibre-optic sensor terminating in a reflecting element arranged to reflect a measurement signal when reached by a scanning signal transmitted to said sensor, a second section including a fibre-optic interferometric coupling for combining said measurement signal and a reference signal to form a combined return signal and further including a fibre-optic for transmitting said scanning signal and combined reflected signal in opposite directions, and a third section including an optical scanning signal generator and an electro-optical analysis system for said return signal, and wherein said third section includes a polarizing beam separator arranged to allow passage of said scanning signal towards said transmission fibre-optic, but to deviate said return beam towards said electro-optical analysis system, and wherein said third section also includes a λ/4 delay plate disposed between said polarizing beam separator and said transmission fibre-optic.

2. An interferometric detector with a fibre-optic sensor, characterized by comprising three main sections connected together, a first section including a fibre-optic sensor terminating in a reflecting element arranged to reflect a measurement signal when reached by a scanning signal transmitted to said sensor, a second section including a fibre-optic interferometric coupling for combining said measurement signal and a reference signal to form a combined return signal and further including a fibre-optic for transmitting said scanning signal and combined reflected signal in opposite directions, and a third section including an optical scanning signal generator and an electro-optical analysis system for said return signal, and wherein said third section includes a polarizing plate traversed by said scanning signal, and a plurality of beam separators and polarizing beam separators arranged to divide said scanning signals into a signal of horizontal polraization which is freely transmitted to said transmission fibre-optic, and into a signal of vertical polarization which is passed through a modulator and then transmitted to said transmission fibre-optic, said beam separators and said polarizing beam separators also dividing said return signal into said measurement signal and into said reference signal, then recombining them after said measurement signal has passed through a λ/4 delay plate.

3. A detector as claimed in claim 2, characterised in that said electro-optical analysis system comprises a pair of photodetectors for detecting the interference fringes of said recombined return signal, and a differential amplifier for the algebraic sum of the outputs of said photodetectors.

* * * * *